(12) United States Patent
Kuenzner et al.

(10) Patent No.: US 6,816,079 B1
(45) Date of Patent: Nov. 9, 2004

(54) DEVICE FOR CONTROLLING A DISPLAY

(75) Inventors: Hermann Kuenzner, Freising (DE); Michael Herrler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/070,930

(22) PCT Filed: Aug. 2, 2000

(86) PCT No.: PCT/EP00/07458

§ 371 (c)(1), (2), (4) Date: Aug. 15, 2002

(87) PCT Pub. No.: WO01/20440

PCT Pub. Date: Mar. 22, 2001

(30) Foreign Application Priority Data

Sep. 13, 1999 (DE) .......................... 199 43 580

(51) Int. Cl.[7] .................................................. G08B 5/00
(52) U.S. Cl. ................................ 340/815.4; 340/815.6; 345/700
(58) Field of Search ........................... 340/815.4, 815.6; 345/352, 146, 184, 353, 354, 902, 326, 700; 701/29, 33; 700/83, 17

(56) References Cited

U.S. PATENT DOCUMENTS

| | | | | |
|---|---|---|---|---|
| 5,708,787 A | * | 1/1998 | Nakano | ........................ 395/352 |
| 5,963,704 A | * | 10/1999 | Mimura | ........................ 385/95 |
| 6,009,355 A | * | 12/1999 | Obradovich | ................. 340/336 |
| 6,104,399 A | * | 8/2000 | Volkel | ......................... 345/352 |

FOREIGN PATENT DOCUMENTS

| | | |
|---|---|---|
| DE | 38 36 555 A1 | 5/1990 |
| EP | 0 701 926 A2 | 3/1996 |
| EP | 0 911 750 A2 | 4/1999 |
| WO | WO 97/21295 | 6/1997 |

\* cited by examiner

*Primary Examiner*—Anh V. La
(74) *Attorney, Agent, or Firm*—Crowell & Moring LLP

(57) ABSTRACT

The invention relates to a device for controlling a display. Said device has an actuating member which can be rotated about a longitudinal axis and can be moved in the direction of said longitudinal axis whereby a point can be selected from a menu, partial menus, functional and/or functional value comprising menu structures and is represented on said screen in an optically high-lighted field. Said actuating member has an initial position and relative to said initial position can undergo an additional movement and has two additional degrees of freedom. During such additional movement of actuating member, a field is selectable from a point in the menu structure which is in a peripheral area of said screen and can, by virtue of the rotational/translational movement of the actuating member, be selected from said screen in a middle region surrounded by an edge located in a sub-field within said menu structure assigned to said field.

20 Claims, 4 Drawing Sheets

DEVICE FOR CONTROLLING A DISPLAY

BACKGROUND AND SUMMARY OF THE INVENTION

The invention relates to a system for controlling a video screen display for a motor vehicle for the selection of menus and/or functions, having a rotatable operating element and having a video screen display.

A system of this type is known from German patent document DE 19752056 A. In that document, a hierarchical setup of the presentation is selected for facilitating a rapid orientation concerning the selected menu or the set or triggered submenu/function. The possible menus are arranged in the peripheral (marginal) area, while the pertaining submenus or functions or function values are situated in the center area. The marking for the selected menu/submenu/function or the menu/submenu/function triggered by a preferably provided enter function is preferably visually highlighted in the video screen display and, depending on the selection made, is situated at different points on the video screen. When the menu and the selected submenu/function are simultaneously marked in a visually highlighted manner, these markings are situated in alternating positions of the video screen.

It is an object of the present invention to provide a system of the above-mentioned type, in the case of which the selected setting, that is, the set or triggered menu/submenu/function can be rapidly and clearly recognized.

The invention achieves this object by providing a system for controlling a video screen display for a motor vehicle for the selection of menus and/or functions, having a rotatable operating element and having a video screen display. A marking in the video screen display is visually highlighted corresponding to the position of the operating element. The visually highlighted marking is always arranged in the same position of the video screen.

Now the marking, which primarily interests the viewer, is always situated in the same position of the video screen. A time-consuming "searchingly looking around" is eliminated.

Advantageous further developments of the invention are described herein and, together with other characteristics of the invention, are explained in detail by means of the drawings.

DETAILED DESCRIPTION OF THE DRAWINGS

Figure 1:
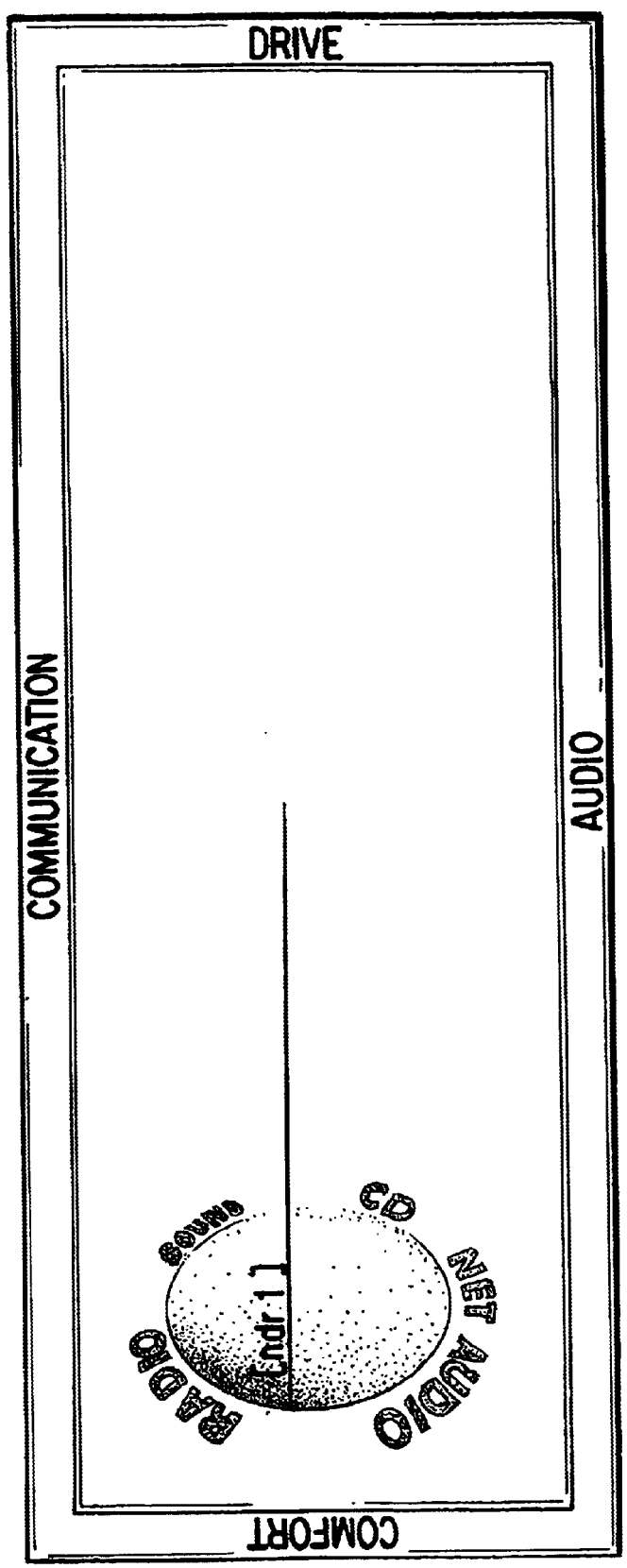
FIG. 1 is a view of a video screen display, which is used within the framework of a multifunctional operating device according to the invention.

FIG. 1 illustrates the video screen display in principle which is provided within the scope of the invention. A peripheral or marginal area 2 and a center area 3 are situated within a display surface 1, which is identical with the display area of a video screen. In the peripheral area 2, four inscriptions for the menus to be controlled or triggered by means of an operating element (which is not shown) are displayed in four positions which, relative to the center of the display surface 1, are mutually offset by approximately 90°, respectively. These are the comfort menus (such as heater, air conditioner, seat and mirror settings), the communication menus (telephone, data traffic, e-mail), the drive menus (navigation, onboard computer, travel information) and the audio menus (radio, CD, sound adjustment, Internet radio). The operating element is preferably a rotary-push button known from German patent document DE 3836555 A. With this button, a rotation within a menu hierarchy plane, carries out a selection and, a pressing operation of the button performs an enter function, i.e., a triggering of the selected menu(sub)point/function can be carried out. In addition or as an alternative, it is also possible to trigger the menus by separate switches. In the illustrated example, the "audio" menu point is already selected.

As illustrated in FIG. 1, the pertaining "audio" inscription is stressed by highlighting. The markings for the audio submenus Radio, Sound (adjustments), CD, and Net (Internet) Audio are illustrated as a closed oval figure on the video screen. In this case, the marking for the respectively selected submenu (here: Radio) is visually highlighted by a special brightness and size and is situated in one and the same position in the left upper sector of the oval.

Figure 2:
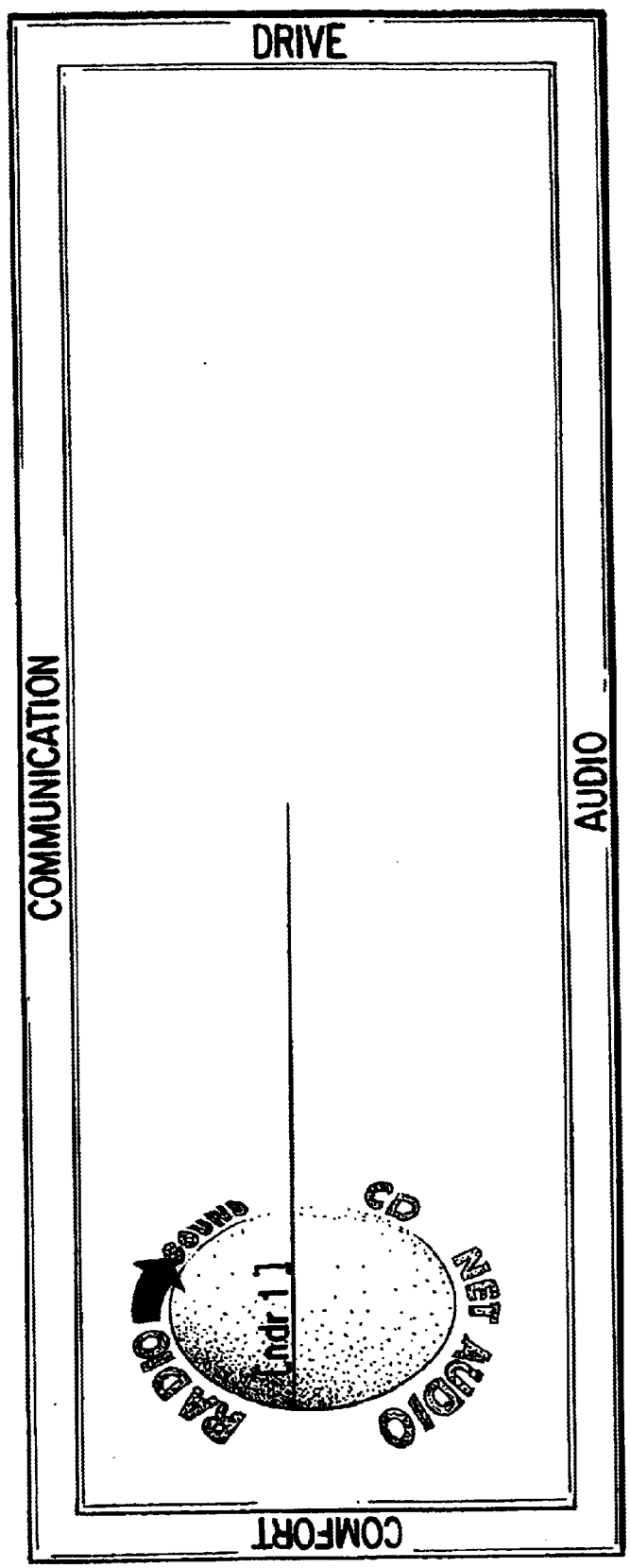
FIGS. 2 to 4 are respective views of the video screen display of FIG. 1 after respective actuating of an assigned operating element.

On this basis, the user can select the next submenu by means of the operating element. When he rotates the latter clockwise, the sound submenu will be selected. The rotating movement of the operating element is represented by an animation of the oval figure. All menu positions move in the corresponding direction so as to symbolize the movement direction (see FIG. 2, animation symbolized by an arrow 5). The reaching of the sound submenu is identified by displaying the marking "Sound" in the same position in the left upper sector (not shown).

Figure 3:
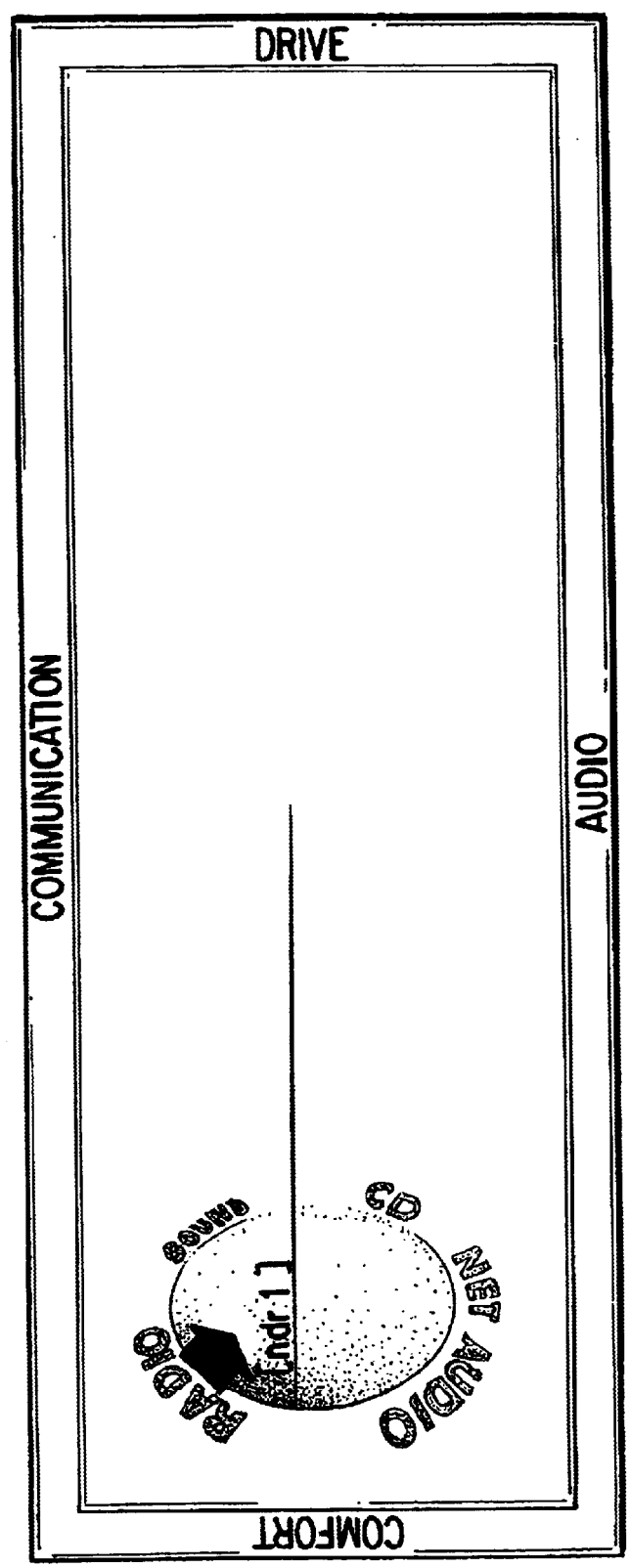
Figure 4:
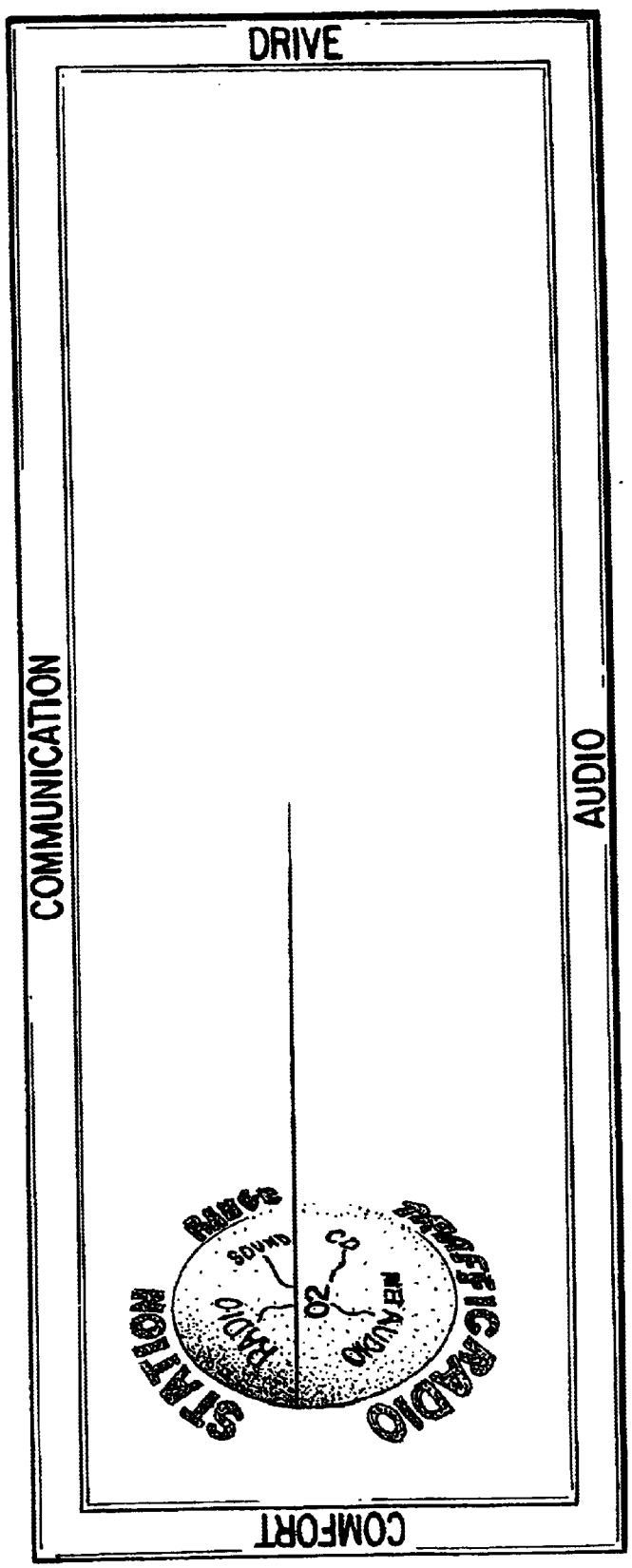

However, the user can also trigger the "Radio" submenu by means of the "enter" function. This is first displayed by shifting the "Radio" menu position, together with the functions of the same menu hierarchy step toward the center of the circle (FIG. 3, shifting symbolized by an arrow 6), and subsequently an image is displayed on the video screen, as illustrated in FIG. 4. The markings concerning the pertaining radio functions: stations (set), range (frequency), or traffic radio are then illustrated instead of the preceding oval. The marking for the triggered "station" function is again situated at the same spot, i.e., the left top; the other markings can also be recognized but are not highlighted visually.

As another special characteristic, the oval O2 of the markings for the previously adjustable radio etc. submenus is outlined within the oval O1. In addition, it is possible to display the transition from the radio submenu to the radio functions as an animation. For this purpose, the diameter of the oval O1 decreases continuously to the oval O2. Simultaneously with the oval O2, the oval O1 is illustrated as shown for the markings of the radio functions.

The setting of a higher plane with respect to the hierarchy is correspondingly illustrated visually by enlarging the oval O2 with respect to the oval O1. As described in German patent document DE 3836555 A, the pertaining operating sequence can be triggered by a separate return function (not shown) or by another pressing of the corresponding menu key.

Instead of the reduction/enlargement of the oval O1→O2 or O2→O1, in the case of a transition into the next hierarchy plane, the opposite change of the oval diameter can take place. Higher hierarchy planes are then illustrated with a larger diameter than lower hierarchy planes.

In this manner, the user will, on the whole, visually receive an acknowledgment on the video screen concerning the operating sequences carried out by him.

What is claimed is:

1. A system for controlling a video screen display of a motor vehicle, the system comprising:
   a rotatable operating element operatively coupled with the video screen display;
   a plurality of markings provided on the video screen display, said plurality of markings representing menus and/or functions to be selected, wherein any one of said markings is visually highlighted in correspondence with rotational positions of the rotatable operating element; and
   wherein each of the plurality of markings, when visually highlighted, is located in a predetermined position on the video screen display, which predetermined position is the same for every one of the plurality of markings.

2. The system according to claim 1, wherein the plurality of markings assigned to respective positions of the rotatable operating element are arranged in one of a circular or oval structure on the video screen display, and wherein the markings that are not visually highlighted are also visible to a user.

3. The system according to claim 2, wherein the rotatable operating element is operatively coupled with the video screen display such that during rotating movement of the operating element, the plurality of markings also perform a rotating movement on the video screen display.

4. A system for controlling a video screen display of a motor vehicle, the system comprising:
   a rotatable operating element operatively coupled with the video screen display;
   a plurality of markings provided on the video screen display, said plurality of markings representing menus and/or functions to be selected, wherein any one of said markings is visually highlighted in correspondence with rotational positions of the rotatable operating element;
   wherein each visually highlighted marking is always arranged in a same position on the video screen display; and
   wherein by operating the rotatable operating element to perform an enter function, a menu and/or function assigned to the visually highlighted marking is triggerable such that the menu and/or function visually moves into a background of the video screen display.

5. The system according to claim 4, wherein the menu/function moving visually into the background forms one of a circular and oval structure.

6. The system according to claim 5, wherein the structure of the markings moving visually into the background is arranged within the structure of the markings visually in a foreground.

7. The system according to claim 4, wherein submenus and/or subfunctions assigned to the visually highlighted marking that is triggered visually replace the triggered marking.

8. The system according to claim 5, wherein submenus and/or subfunctions assigned to the visually highlighted marking that is triggered visually replace the triggered marking.

9. The system according to claim 6, wherein submenus and/or subfunctions assigned to the visually highlighted marking that is triggered visually replace the triggered marking.

10. A system for controlling a video screen display of a motor vehicle, the system comprising:
    a rotatable operating element operatively coupled with the video screen display;
    a plurality of markings provided on the video screen display, said plurality of markings representing menus and/or functions to be selected, wherein any one of said markings is visually highlighted in correspondence with rotational positions of the rotatable operating element;
    wherein each visually highlighted marking is always arranged in a same position on the video screen display;
    wherein the plurality of markings assigned to respective positions of the rotatable operating element are arranged in one of a circular or oval structure on the video screen display, and wherein the markings that are not visually highlighted are also visible to a user; and
    wherein by operating the rotatable operating element to perform an enter function, a menu and/or function assigned to the visually highlighted marking is triggerable such that the menu and/or function visually moves into a background of the video screen display.

11. The system according to claim 10, wherein the menu/function moving visually into the background forms one of a circular and oval structure of a smaller diameter.

12. The system according to claim 11, wherein the structure of the markings moving visually into the background is arranged within the structure of the markings visually in a foreground.

13. A system for controlling a video screen display of a motor vehicle, the system comprising:
    a rotatable operating element operatively coupled with the video screen display;
    a plurality of markings provided on the video screen display, said plurality of markings representing menus and/or functions to be selected, wherein any one of said markings is visually highlighted in correspondence with rotational positions of the rotatable operating element;
    wherein each visually highlighted marking is always arranged in a same position on the video screen display;
    wherein the plurality of markings assigned to respective positions of the rotatable operating element are arranged in one of a circular or oval structure on the video screen display, and wherein the markings that are not visually highlighted are also visible to a user;
    wherein the rotatable operating element is operatively coupled with the video screen display such that during rotating movement of the operating element, the plurality of markings also perform a rotating movement on the video screen display; and
    wherein by operating the rotatable operating element to perform an enter function, a menu and/or function assigned to the visually highlighted marking is triggerable such that the menu and/or function visually moves into a background of the video screen display.

14. The system according to claim 13, wherein the menu/function moving visually into the background forms one of a circular and oval structure.

15. The system according to claim 14, wherein the structure of the markings moving visually into the background is arranged within the structure of the markings visually in a foreground.

16. A method of controlling a video screen display of a motor vehicle operatively coupled with a rotatable operating element for selecting menus and/or functions available to the motor vehicle, the method comprising the acts of:

visually highlighting a marking corresponding to a rotational position of the operating element on the video screen display; and always arranging each respective visually highlighted marking in a predetermined position on the video screen display, which predetermined position is the same for every one of the plurality of markings.

17. The method according to claim 16, further comprising the acts of:

assigning a plurality of markings to positions of the rotatable operating element;

forming a circular or oval structure on the video screen display with the plurality of markings; and maintaining visibility of those plurality of markings that are not visually highlighted.

18. The method according to claim 17, further comprising the act of rotating the plurality of markings on the video screen display in correspondence with a rotating movement of the rotatable operating element.

19. A method of controlling a video screen display of a motor vehicle operatively coupled with a rotatable operating element for selecting menus and/or functions available to the motor vehicle, the method comprising the acts of:

visually highlighting a marking corresponding to a rotational position of the operating element on the video screen display;

always arranging each respective visually highlighted marking in a same position on the video screen display, assigning a plurality of markings to positions of the rotatable operating element;

forming a circular or oval structure on the video screen display with the plurality of markings; and maintaining visibility of those plurality of markings that are not visually highlighted; and triggering a menu and/or function assigned to the visually highlighted marking by performing an enter function of the rotatable operating element; and during the triggering operation, moving the markings visually into a background position of the video screen display.

20. The method according to claim 19, further comprising the act of forming a circular or oval structure with the markings moved visually into the background, the circular or oval structure having a smaller diameter than the circular or oval structure previously held by the markings.

* * * * *